(12) United States Patent
Corral Rodriguez et al.

(10) Patent No.: US 8,936,311 B2
(45) Date of Patent: Jan. 20, 2015

(54) HEADREST FOR MOTOR VEHICLE SEATS

(71) Applicant: Batz, S.Coop., Igorre (ES)

(72) Inventors: Pedro Corral Rodriguez, Castro Urdiales (ES); Joseba Palacio Argüelles, Santurtzi (ES)

(73) Assignee: Batz S.Coop, Igorre (ES)

( * ) Notice: Subject to any disclaimer, the term of this patent is extended or adjusted under 35 U.S.C. 154(b) by 118 days.

(21) Appl. No.: 13/835,561

(22) Filed: Mar. 15, 2013

(65) Prior Publication Data

US 2013/0257118 A1 Oct. 3, 2013

(30) Foreign Application Priority Data

Mar. 28, 2012 (ES) .................................. 201230466

(51) Int. Cl.
*B60N 2/48* (2006.01)
*B60N 2/427* (2006.01)

(52) U.S. Cl.
CPC .......... *B60N 2/42727* (2013.01); *B60N 2/4808* (2013.01); *B60N 2/4885* (2013.01); *B60N 2/4279* (2013.01)
USPC ................................ 297/216.12; 297/216.14

(58) Field of Classification Search
USPC ........................ 297/216.12, 216.14, 314, 406
See application file for complete search history.

(56) References Cited

U.S. PATENT DOCUMENTS

| 4,778,218 A | 10/1988 | Suman |
| 6,474,733 B1 | 11/2002 | Heilig et al. |
| 6,575,494 B1 | 6/2003 | Heilig et al. |
| 6,666,516 B2 | 12/2003 | Grammss et al. |
| 6,688,697 B2 | 2/2004 | Baumann et al. |
| 7,073,863 B1 | 7/2006 | Low et al. |
| 2002/0043858 A1 | 4/2002 | Svantesson |
| 2002/0074843 A1 | 6/2002 | Malsch et al. |
| 2005/0127726 A1 | 6/2005 | Schilling |

(Continued)

FOREIGN PATENT DOCUMENTS

| DE | 1003913 B | 3/1957 |
| DE | 3900495 A1 | 7/1990 |

(Continued)

OTHER PUBLICATIONS

Extended European Search Report and Opinion, European Application No. 13382075.3, mailed May 14, 2014, pp. 1-5, European Patent Office, Munich, Germany.

(Continued)

*Primary Examiner* — Kristina Junge
(74) *Attorney, Agent, or Firm* — Tim L. Kitchen; Peter B. Scull; Hamilton, DeSanctis & Cha LLP

(57) ABSTRACT

Headrests for motor vehicle seats. The headrests may include a fixed part, a moving part movable with respect to the fixed part from a rest position to an active position, with connection means connecting the fixed part and the moving part to determine the path and the position of the moving part. A drive device drives and moves the moving part with respect to the fixed part in the event of a crash. Movement of at least one portion of the moving part to a forward position with respect to the active position may be provided by a damping assembly. The damping assembly may also allow the backward movement to the active position after an impact of the user's head on the moving part, absorbing energy in the backward movement.

20 Claims, 16 Drawing Sheets

(56) References Cited

U.S. PATENT DOCUMENTS

| | | |
|---|---|---|
| 2007/0027599 A1* | 2/2007 | Sakai et al. .................. 701/49 |
| 2010/0127541 A1 | 5/2010 | Kotz |
| 2012/0299355 A1 | 11/2012 | Corral Rodriguez et al. |

FOREIGN PATENT DOCUMENTS

| | | |
|---|---|---|
| EP | 0974484 B1 | 12/2002 |
| EP | 1193114 B1 | 5/2005 |
| EP | 1526982 B1 | 3/2006 |
| EP | 1403133 B1 | 4/2009 |
| ES | 1052173 U | 11/2002 |
| GB | 2363323 B | 2/2004 |
| WO | WO2004039626 A1 | 5/2004 |
| WO | WO2004056606 A1 | 7/2004 |

OTHER PUBLICATIONS

Spanish Written Opinion for Spanish Application No. 201230466, mailed Jan. 31, 2014, pp. 1-8, Spanish Patent and Trademark Office, Madrid Spain (Partial English translation).

* cited by examiner

HEADREST FOR MOTOR VEHICLE SEATS

CROSS-REFERENCE TO RELATED APPLICATIONS

This application relates to and claims the benefit and priority to Spanish Patent Application No. P201230466, filed Mar. 28, 2012.

TECHNICAL FIELD

The present disclosure relates to headrests for motor vehicle seats.

BACKGROUND

Headrests referred to as active headrests are known, such active headrests comprising two parts, a fixed part and a moving part, the moving part being movable from a rest position, in which the moving part is attached to the fixed part, to an active position in the event that the vehicle receives a rear impact. In the active position, the moving part is separated from the fixed part and moved towards the head of the occupant in the seat, thereby reducing the distance that the head travels until reaching its support in the headrest, and therefore reducing the risk of the occupant suffering whiplash.

Spanish Patent Application No. ES2344496A1 describes a headrest for motor vehicle seats comprising a fixed part, a moving part movable with respect to the fixed part from a rest position to an active position, connection means connecting the fixed part and the moving part to determine the path and the position of the moving part, and a drive system comprising a drive device for driving and moving the moving part with respect to the fixed part.

SUMMARY OF THE DISCLOSURE

According to some implementations a headrest is provided that comprises a fixed part, a moving part movable with respect to the fixed part from a rest position to an active position, connection means connecting the fixed part and the moving part, the connection means determining the movement path of the moving part with respect to the fixed part, and a drive system comprising a drive device for driving and moving the moving part with respect to the fixed part in the event of a crash. The headrest may also comprise damping means allowing the movement of at least one portion of the moving part to a forward position with respect to the active position, and allowing the backward movement of the moving part to the active position after an impact of the user's head, absorbing energy in the backward movement.

In the headrests of the prior art, the active position remains fixed, such that when the headrests go into the active position they are blocked and prepared to absorb the greatest possible amount of energy by means of incorporating padding means, such as protective foams for example, maintaining the active position in response to a backward force exerted on the moving part by the head of the occupant in the seat during a collision event.

According to some implementations disclosed and contemplated herein, in addition to the conventional padding means arranged in the moving part for receiving the impact of the user's head, damping means is included, the damping means allow taking at least one portion of the moving part further forward with respect to the defined active position, such that when the head of the occupant in the seat impacts against the at least one portion of the moving part, as it moves backwards after the received impact, the damping means allow the at least one portion of the moving part to move backwards to the defined active position, and in this backward movement the damping means absorbs energy, reducing the velocity of the head of the occupant in the seat. As a result, both the seat and the headrest have a lower level of internal energy due to the damping means, which results in a lower release of elastic energy at the time of the rebound as compared to the energy that would otherwise be released without the damping means. This results in the head of the occupant in the seat to lose velocity in the rebound reducing the likelihood or degree of injury.

These and other advantages and characteristics will be made evident in the light of the drawings and the detailed description.

DETAILED DESCRIPTION

Figure 1:
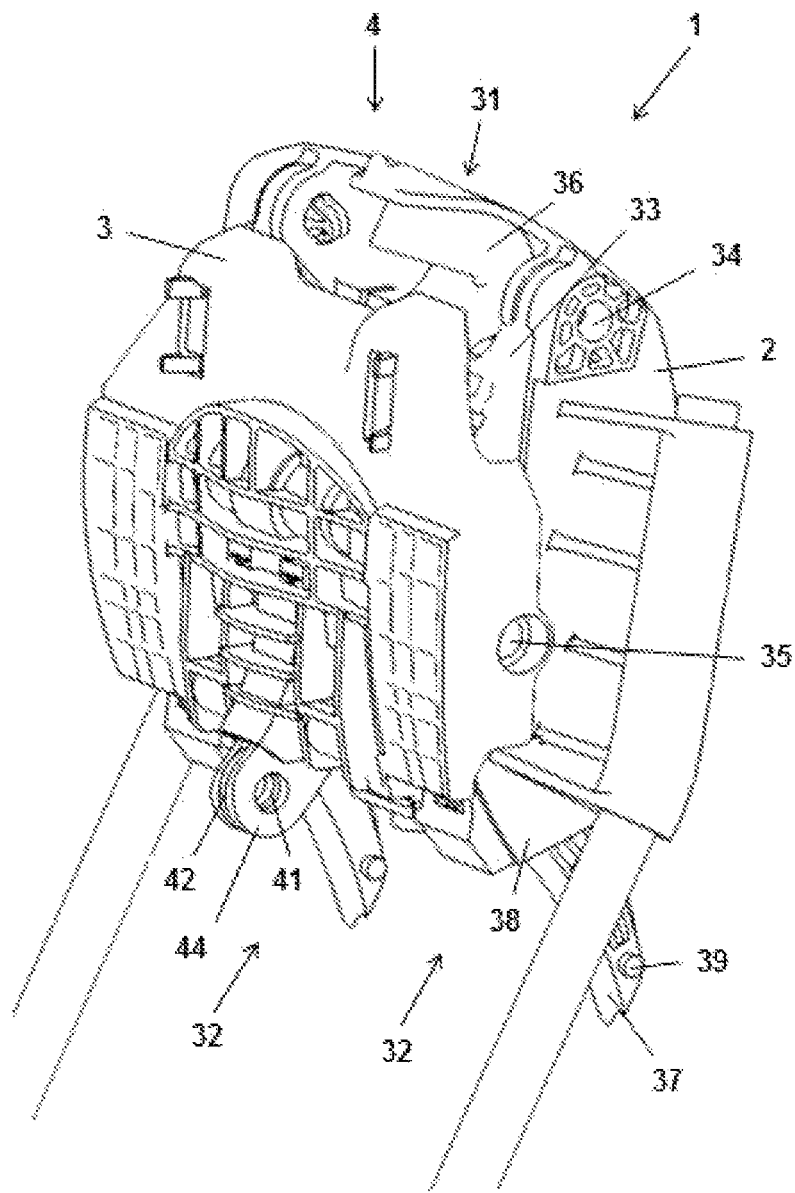
FIG. 1 shows a perspective view of a first implementation of a headrest.

FIG. 1 shows a perspective view of a first implementation of a headrest 1 in a rest position. The headrest 1 may comprise a fixed part 2, a moving part 3 movable with respect to the fixed part 2 from a rest position "O" to an active position "A", indicated in FIG. 3, and connection means 4 connecting the fixed part 2 with the moving part 3. The connection means 4 may comprise an upper arm 31 and two lower lateral connection means 32. The upper arm 31 may comprise two side levers 33, one of each ends of each side lever 33 pivoting with respect to a respective shaft 34 arranged in the fixed part 2, both shafts 34 being coaxial, and the other end of each side lever 33 pivoting with respect to a respective shaft 35 of the moving part 3, both shafts 35 being coaxial. The upper arm 31 also comprises a central body 36 whereby both side levers 33 are attached to one another.

The lower connection means 32 comprise a guide arm 37 attached to the moving part 3 and a channel 38 arranged in the fixed part 2. The moving part 3 is guided with respect to the fixed part 2 by means of the connection between the guide arm 37 and the channel 38. According to some implementations the inclination of the moving part 3 along the path between the rest position "O" and the active position "A" is determined by the connection between the guide arm 37 and the channel 38, the connection being defined by the design of the contour of the guide arm 37 which fits with the height of the channel 38 for all the positions of the desired path of the moving part 3. The guide arm 37 may further comprise a stop 39 which may, for example, be housed in a transverse hole of the guide arm 37 to delimit the furthest position of the moving part 3 with respect to the fixed part 2. The guide arm 37 may have several transverse holes, such that different end positions of the moving part 3 can be chosen according to which hole houses the stop 39. The path and the end position of the moving part 3 are thus defined with the design provided for the guide arm 37 and for the channel 38, as well as with the choice of the position of the stop 39.

Figure 2:
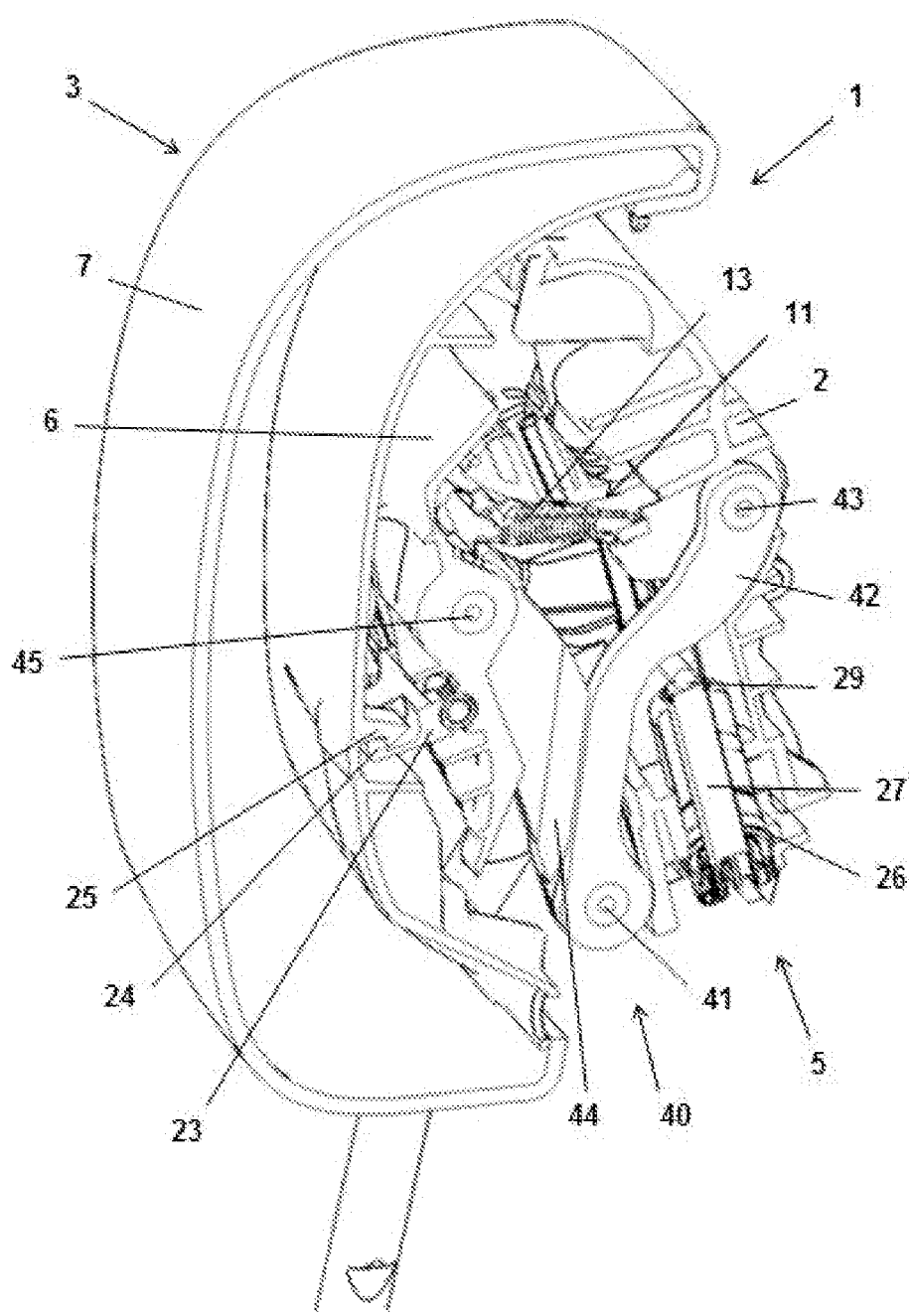
FIG. 2 shows a longitudinal section perspective view of the implementation of FIG. 1, the moving part being in the rest position.

FIG. 2 shows a longitudinal section perspective view of the headrest 1 of FIG. 1 with the moving part 3 being in the rest position. The headrest 1 is a headrest referred to as an active headrest given that it comprises a drive system, the drive system comprising a drive device 5, the function of which is to produce motion. That is, it serves to drive and move the moving part 3 with respect to the fixed part 2 in the event of a crash. According to some implementations, the drive device 5 comprises a pyrotechnic drive device 26, the pyrotechnic drive device 26 being supported and firmly attached to the fixed part 2. The pyrotechnic drive device 26 may comprise a bolt 27 which is a shaft that can be moved from a rest position to an end position when the charge of the pyrotechnic drive device 26 is activated. The drive system may also comprise an articulated device 40 which is pivotally attached to the fixed part 2 and to the moving part 3 at its ends and has at least one pivoting intermediate connection 41, the drive device 5 operatively cooperating with the articulated device 40. According to some implementations, the articulated device 40 comprises a first arm 42 pivotally attached to the fixed part 2 at one of its ends with respect to a shaft 43 and to the pivoting intermediate connection 41, and a second arm 44 attached to the pivoting intermediate connection 41 at one of its ends and the other end pivoting with respect to a shaft 45 of the moving part 3. According to some implementations, the second arm 44 opens into two parts (FIG. 2 only shows one of the parts) in the area of the pivoting intermediate connection 41, such that it braces the first arm 42 in the connection.

Figure 3:
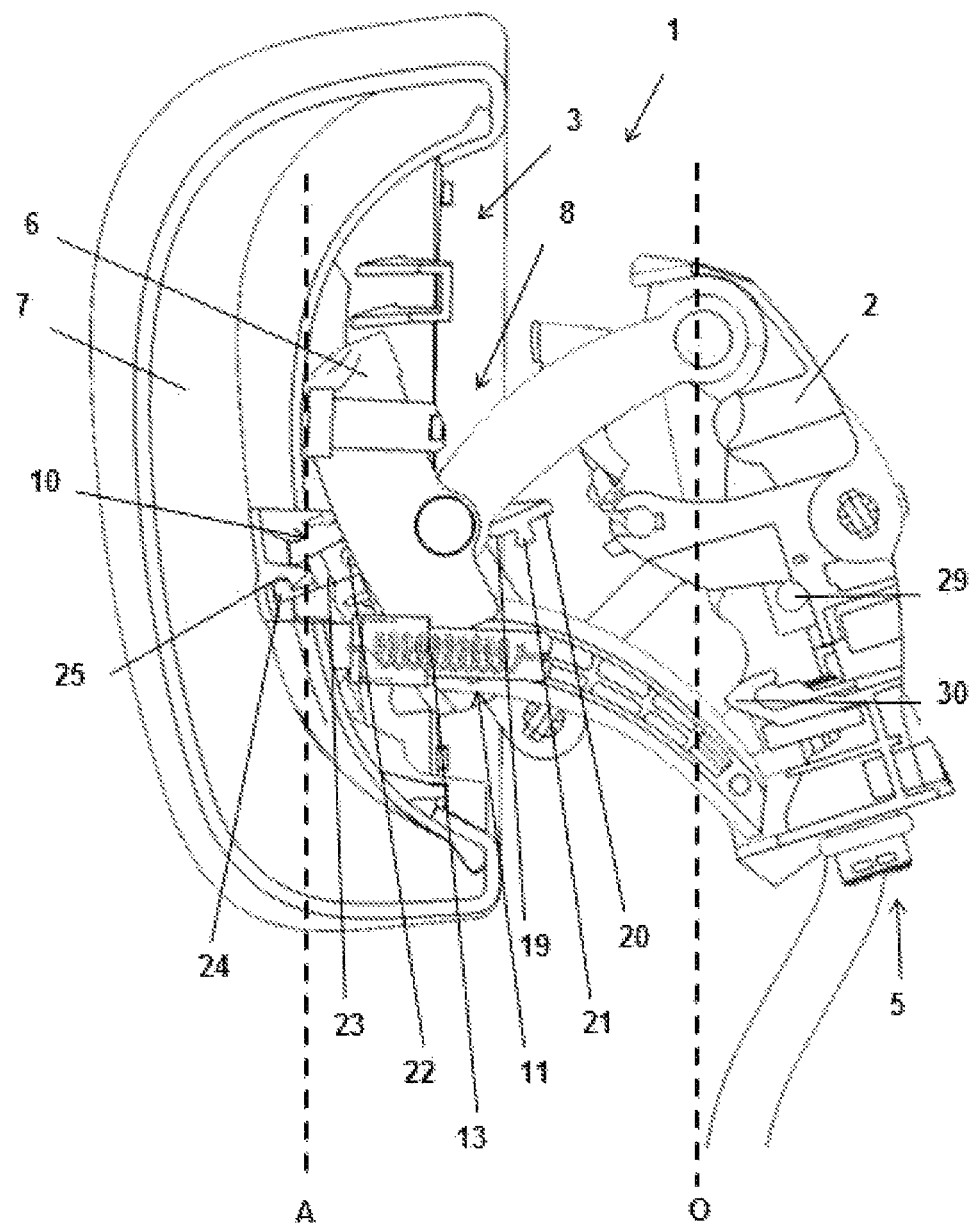
FIG. 3 shows a schematic profile view of the implementation of FIG. 1, the moving part being in the active position.

FIG. 3 shows a schematic profile view of the headrest 1 of FIG. 1, the moving part 3 being in the active position "A". When the drive device 5 is activated in the moment in which the vehicle is in a crash, the drive device 5 moves the moving part 3 with respect to the fixed part 2 from the rest or passive position "O" to the active position "A". The purpose of this type of active headrest is to restrain the user's head in the active position "A" before it acquires too much velocity due to the vehicle crash and thus prevent the so-called "whiplash" in the neck. This active position "A" is a position precisely calculated by each vehicle manufacturer taking into account each seat and headrest model. The active position "A" usually remains fixed. As a result, when headrests of this type go to the active position, the headrest remains in the active position "A" in response to the efforts exerted on the moving part 3 by the user's head. In EuroNcap tests a series of parameters of different vehicle systems are evaluated in the event of a crash. As an example, the headrest and seat unit is assessed with one of the parameters measured being the forward rebound velocity of a dummy's head that mimics the head of a passenger/user. After a rear impact, the user's head impacts with the moving part 3 of the headrest 1 which is in the active position "A", and both the seat and the headrest 1 release the elastic energy they have acquired, driving the user's head forward like a catapult, producing a very harmful effect. For this reason the active position "A" is calculated as precisely as possible, such that since the position is blocked, the rebound of the user's head, and therefore the velocity at which the head bounces off the headrest is the lowest possible. The foam covering, such as a protective foam, of the moving part 3 of the headrest 1 acts to absorb energy and therefore reduces the rebound velocity of the user's head to a certain extent.

According to some implementations the moving part 3 of the headrest 1 comprises two portions, a first portion 6 attached to the fixed part 2 by means of the connection means 4, and a second portion 7 associated with the first portion 6 and usually covered with a protective foam. The drive device 5 allows moving the moving part 3 to the active position "A", such that when this movement occurs, both the first portion 6 and the second portion 7 move to the active position "A", as can be observed in FIG. 3.

Figure 4:
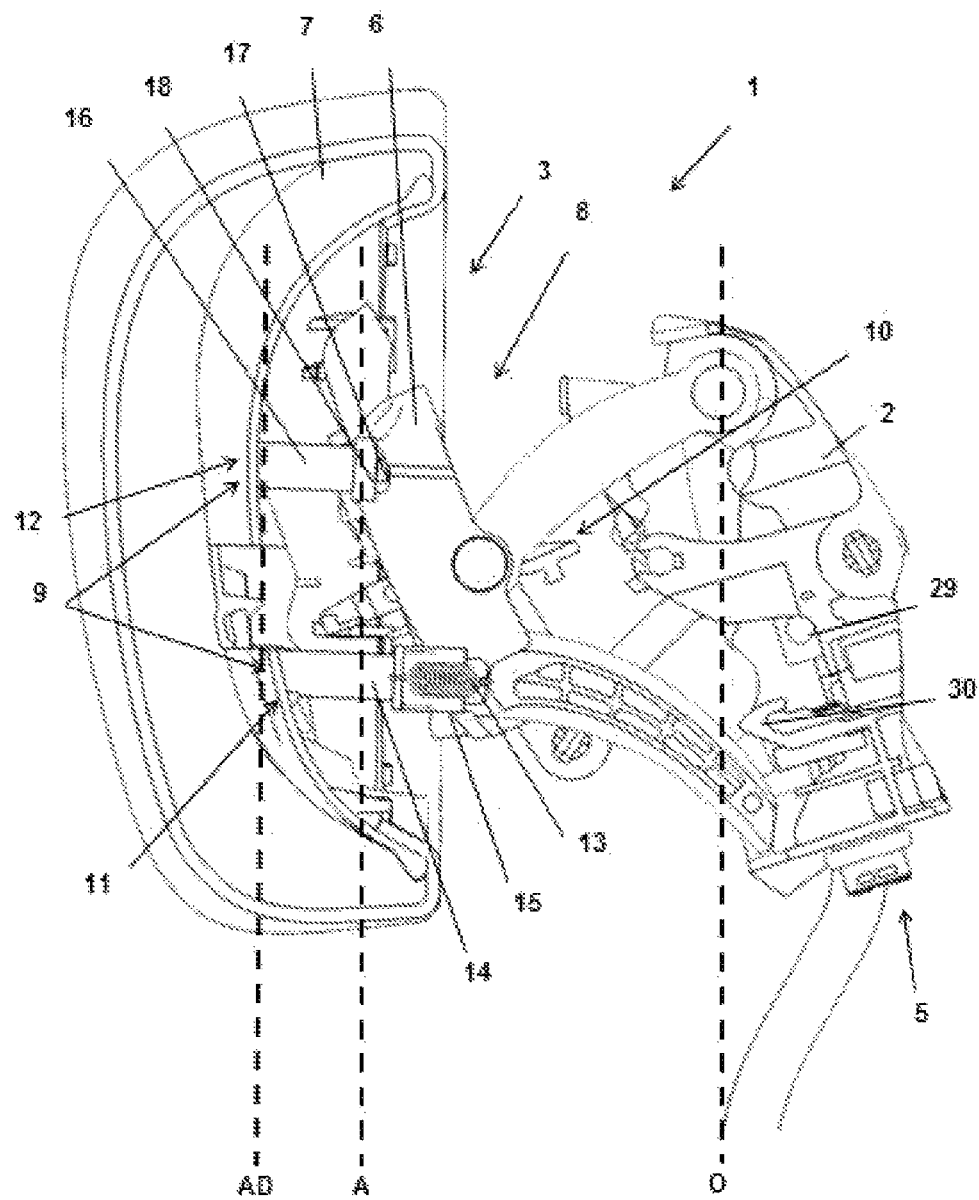
FIG. 4 shows a schematic profile view of the implementation of FIG. 1, the second portion of the moving part being located in a forward position with respect to the active position.
Figure 5:
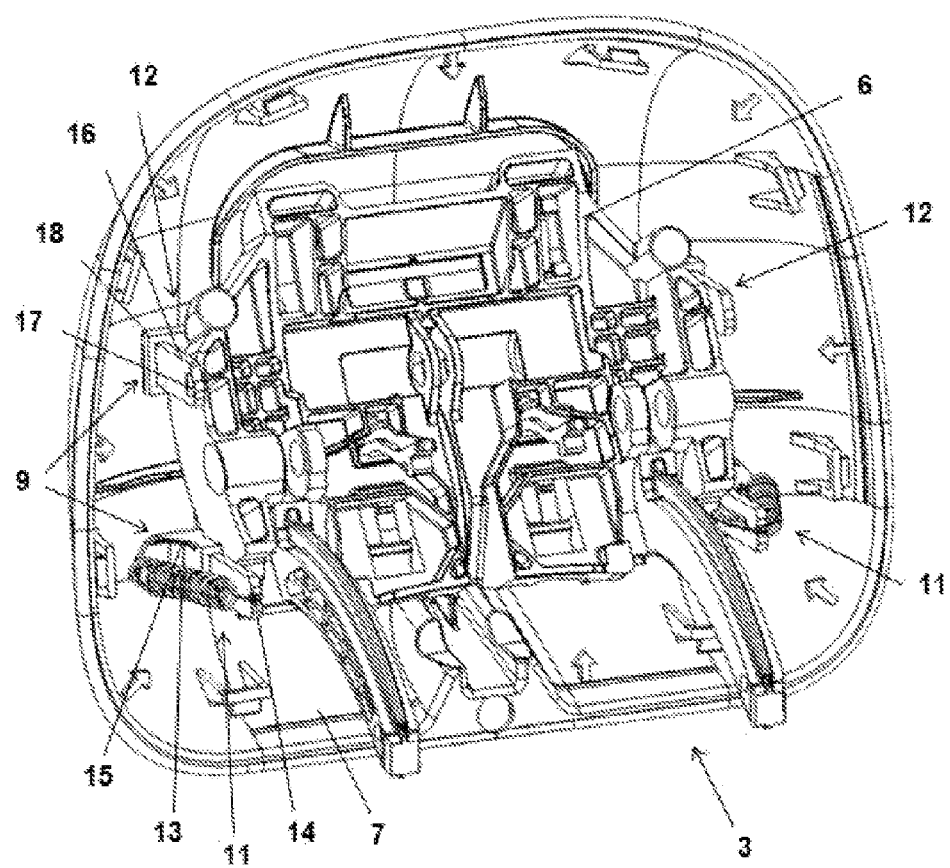
FIG. 5 shows a rear view of the moving part of the implementation of FIG. 1.

FIG. 4 shows a schematic profile view of the headrest 1 of FIG. 1 with the second portion 7 of the moving part 3 being located in a forward position "AD" with respect to the active position "A". To reduce the rebound velocity of the user's head to a greater extent, the headrest 1 comprises damping means 8 allowing the movement of the second portion 7 to a forward position "AD" with respect to the active position "A", and after the impact of the user's head with the second portion 7 occurs, allowing the backward movement of the second portion 7 from the "AD" position to the active position "A", the damping means 8 absorbing energy in the backward movement. To perform this function, the damping means 8 may comprise a damping device 9 and a blocking mechanism 10 for the damping device 9. FIG. 5 shows a rear view of the moving part 3 of the implementation of the headrest 1 of FIG. 1. According to some implementations the damping device 9 of the damping means 8 comprises two identical damping units 11 arranged on both sides of the moving part 3, which allow the movement of the second portion 7 of the moving part 3 with respect to the first portion 6, and two identical guiding units 12 arranged on both sides of the moving part 3 which allow defining the direction of movement of the second portion 7 of the moving part 3 with respect to the rest of the moving part 3 when the damping units 11 move the second portion 7.

According to some implementations each damping unit 11 comprises elastic means 13, such as a spring or other type of elastic element, a support 14 attached to the second portion 7 at one end, and a damping guide 15 attached to the first portion 6 with a groove therein that traverses it, the support 14 being introduced in the groove, and one end of the elastic means 13 being attached to the free end of the support 14, and the other end of the elastic means 13 being attached to an end of the damping guide 15 located on the side of the second portion 7.

According to some implementations each guiding unit 12 comprises a guide 16 attached to the second portion 7 at one end, the guide 16 comprising a protuberance 17 at the free end opposite the attachment with the second portion 7. The guiding unit 12 also comprises a guiding support 18 attached to the first portion 6 with a groove therein that traverses it, the guide 16 being introduced in the groove. Therefore, when the second portion 7 is moved to the forward position "AD" driven by the damping unit 11, the elastic means 13 causing at least in part the movement, the second portion 7 is moved, guided by the guiding unit 12, and the protuberance 17 abuts the guide 16 in the groove of the guiding support 18, the second portion 7 not being able to move further forward.

Figure 6:
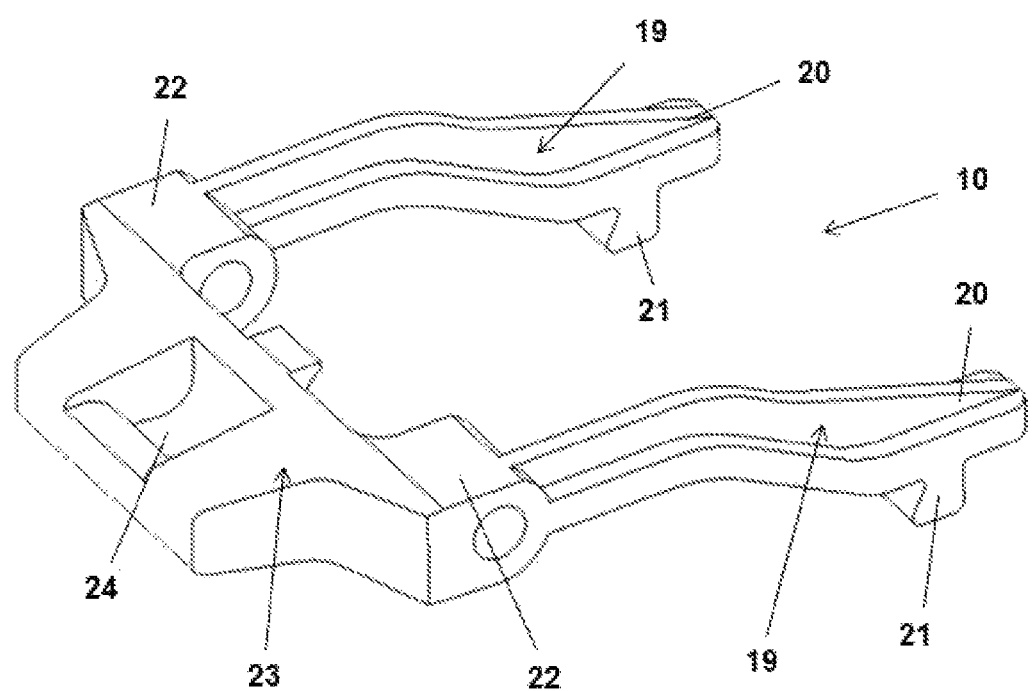
FIG. 6 shows a perspective view of the blocking mechanism of the implementation of FIG. 1.

FIG. 6 shows a perspective view of a blocking mechanism for use with a headrest according to the implementation of FIG. 1. In this implementation, the blocking mechanism 10 of the damping means 8 comprises two identical drive cams 19, each of which having a free end 20 with which the drive device 5 cooperates, having a projection 21 close to the free end 20 in the lower part thereof arranged for cooperating with the fixed part 2 of headrest 1. The drive cams 19 also comprise a pivoting end 22 which pivots in a shaft (not shown in FIG. 6) attached to the first portion 6 of the moving part 3. The blocking mechanism 10 also comprises a retaining cam 23 integrally attached to the pivoting end 22 of the drive cams 19 at one end, and the other end forming a retaining end 24 arranged for cooperating with the second portion 7. In this implementation, the second portion 7 of the moving part 3 comprises retaining means 25, and the blocking mechanism 10 is pivotally arranged in the first portion 6 of the moving part 3 by means of the pivoting end 22 of the drive cams 19, with the retaining end 24 of the retaining cam 23 arranged facing the retaining means 25 of the second portion 7, such that the retaining means 25 and the retaining cam 23 are attached to one another when the second portion 7 has not been moved to the forward position "AD", or in other words, when the damping means 8 is blocked from advancing the second portion 7 forward to the position "AD" as a result of an attachment between retaining means 25 and an opening in the retaining end 24. This blocking situation occurs either when the headrest 1 is in the rest position, as can be observed in FIG. 2, or when the second portion 7 of the moving part 3 is in the active position "A", as can be observed in FIG. 3, and in such situations the elastic means 13 of the damping unit 11 is tensed and therefore potentially loaded. According to some implementations the elastic means 13 is a tension spring and is in a stretched state when the damping means is blocked. When the second portion 7 is released and moved to the forward position "AD", the tension is released from the spring, causing it to contract.

Figure 7:
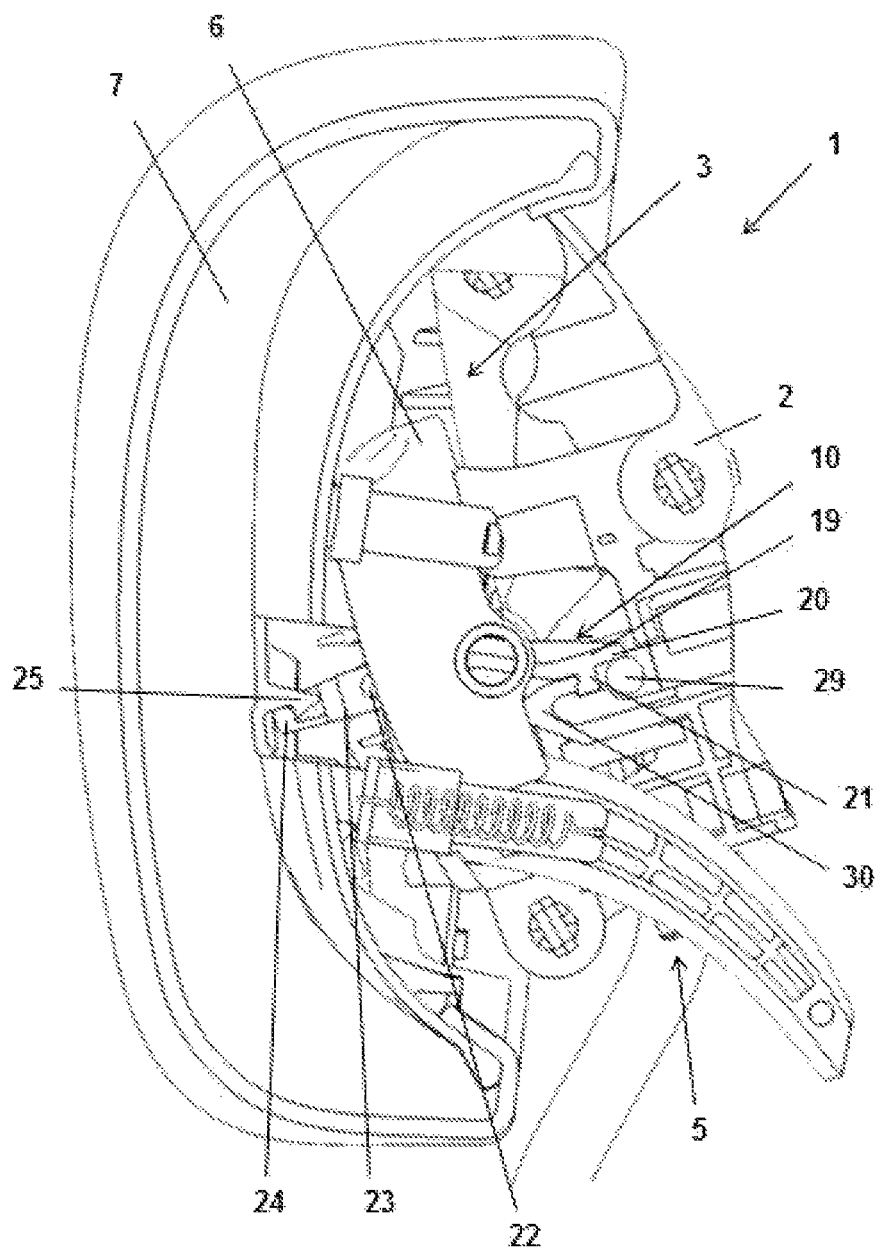
FIG. 7 shows a schematic profile view of the implementation of FIG. 1, the moving part being in the rest position.

In the implementation of the headrest 1 of FIG. 1, when in the rest position as can be observed in FIG. 2, the fixed part 2 and the moving part 3 are attached to one another and form a single compact body. In this arrangement the pyrotechnic drive device 26 is not activated, and the bolt 27 is in the rest situation being withdrawn in the pyrotechnic drive device 26. The drive device 5 also comprises a drive runner with a shaft 29 fitting in the runner, the shaft 29 of the drive runner being located in its lower position, and the bolt 27 is located below the central part of the shaft 29 of the drive runner. According to some implementations, the fixed part 2 of the headrest 1 of the invention comprises two fixed hooks 30 integral with the fixed part 2, the fixed hooks 30 cooperating with the moving part 3 by means of the projection 21 of the drive cam 19 of the blocking mechanism 10, such that the headrest 1 is prevented from being able to be opened manually and from being able to access the inside thereof and manipulate the different elements thereof, as can be observed in FIG. 7 showing a schematic profile view of the headrest 1 of FIG. 1, the moving part 3 being in the rest position. In this same rest situation, the free end 20 of each drive cam 19 is located above the ends of the shaft 29 of the drive runner, and the retaining end 24 of the retaining cam 23 of the drive cams 19 is cooperating, engaging the retaining means 25 of the second portion 7 to block the damping means 8 from advancing the second portion 7 to the position "AD".

When the vehicle to which the headrest 1 is attached is in a crash, the pyrotechnic charge of the pyrotechnic drive device 26 is activated when an electric signal arrives from a sensor. The bolt 27 is then activated and goes from the rest position to the end position with two steps occurring one after the other between the two positions. In the first step, the bolt 27 travels the distance that initially separates it from the lower part of the shaft 29 of the drive runner and then contacts the shaft 29 to impart movement of the shaft 29. With the movement of the shaft 29, the upper part of the shaft 29 contacts the lower part of the free end 20 of each drive cam 19, causing a movement of the drive cams 19. Since the drive cams 19 are pivoting at the pivoting end 22, the blocking mechanism 10 pivots at the ends 22, causing a release of the engagement of the drive cams 19 in their projections 21 with respect to the fixed hooks 30, and with the pivoting there is a release of the engagement of the retaining end 24 of the retaining cam 23 with respect to the retaining means 25 of the second portion 7. The fixed hooks 30 are thus released, the fixed part 2 and moving part 3 no longer being attached to one another in a manner that forms a single compact body, and the second portion 7 is also released from its attachment with the first portion 6.

In the second step, the bolt 27 continues the movement and travels the distance separating it from its end position. After traveling the first step, the central upper part of the shaft 29 of the drive runner contacts the lower part of the first arm 42 of the articulated device 40 pushing it, and thus drives and moves it. With the driving, since the first arm 42 is pivotally attached to the fixed part 2 at one of its ends and to the pivoting connection 41 at its other end, and the second arm 44 of the articulated device 40 is attached to the pivoting connection 41 at one end and is pivotally attached to the moving part 3 at its other end, the second arm 44 is driven, also pivoting in the pivoting connection 41. The moving part 3 is thus driven and moved with respect to the fixed part 2 from a rest position "O" to the active position "A", as can be observed in FIG. 3.

Figure 8:
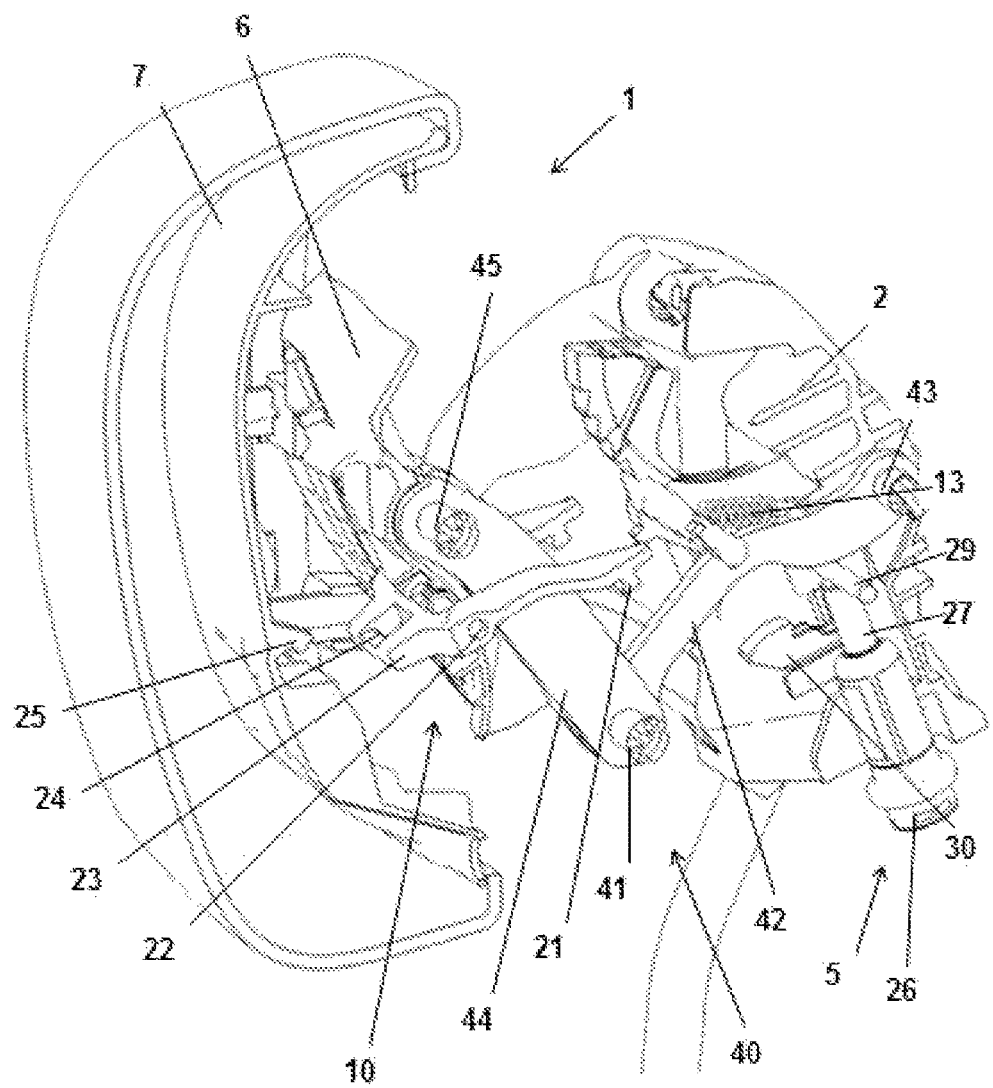
FIG. 8 shows a longitudinal section perspective view of the implementation of FIG. 1, the second portion of the moving part being located in the forward position with respect to the active position.
Figure 9:
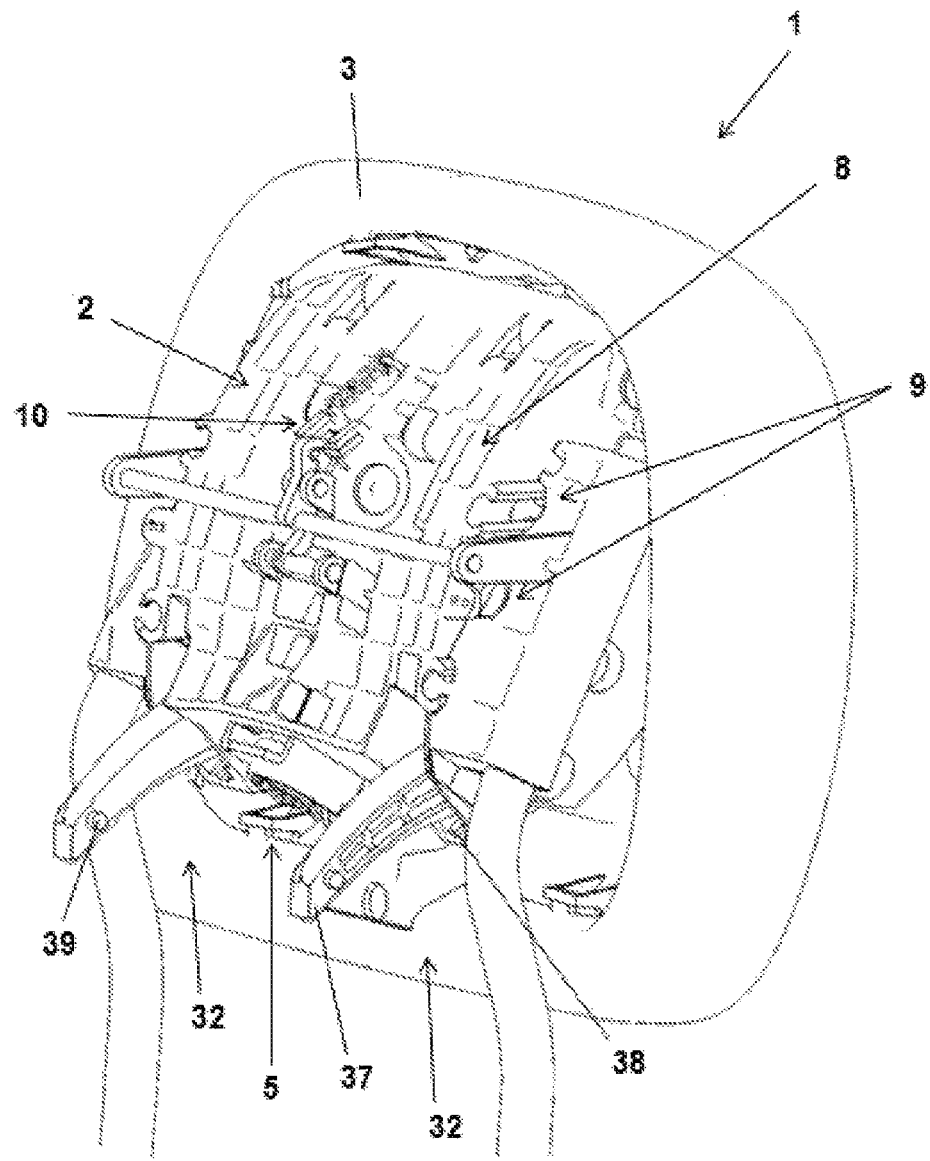
FIG. 9 shows a rear perspective view of a second implementation of a headrest in a rest position.
Figure 10:
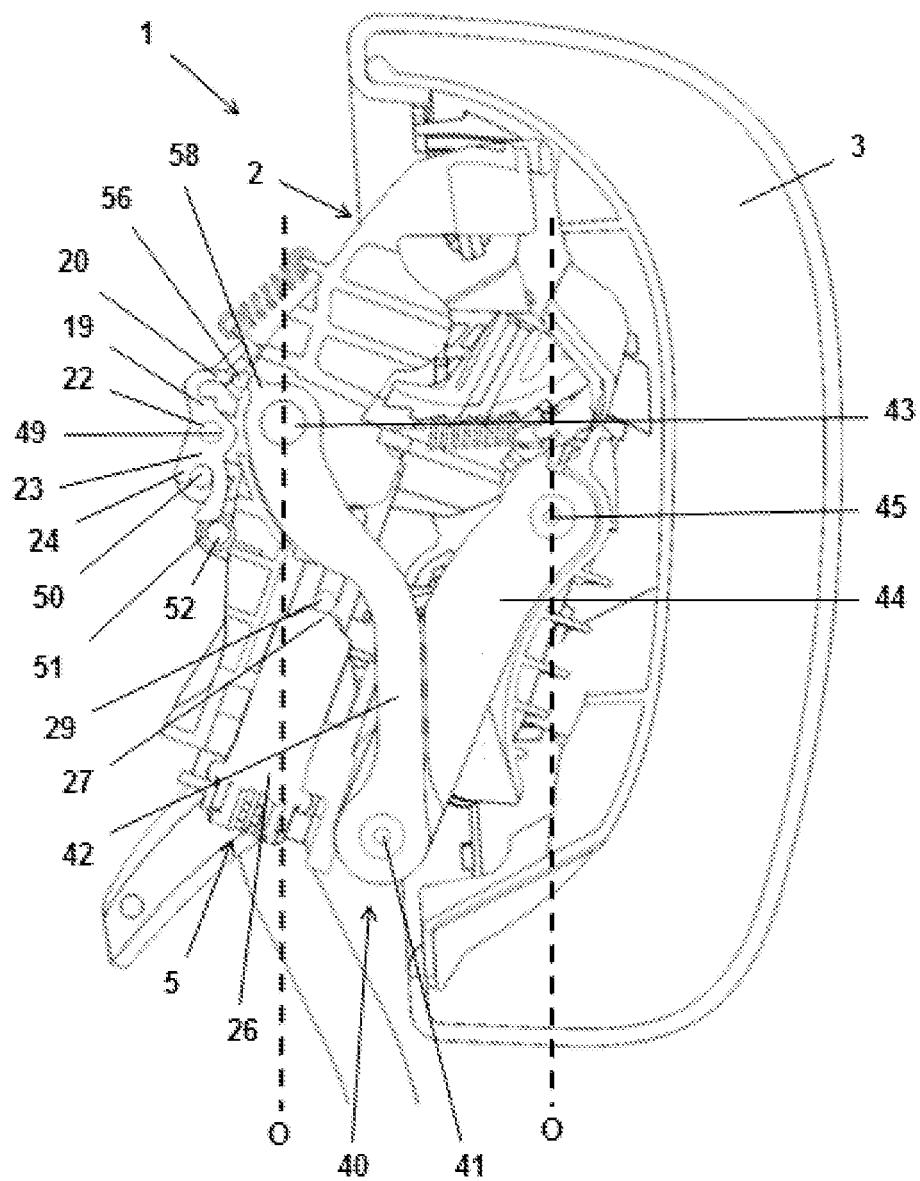
FIG. 10 shows a schematic profile view of the implementation of FIG. 9, the moving part being at rest.
Figure 11:
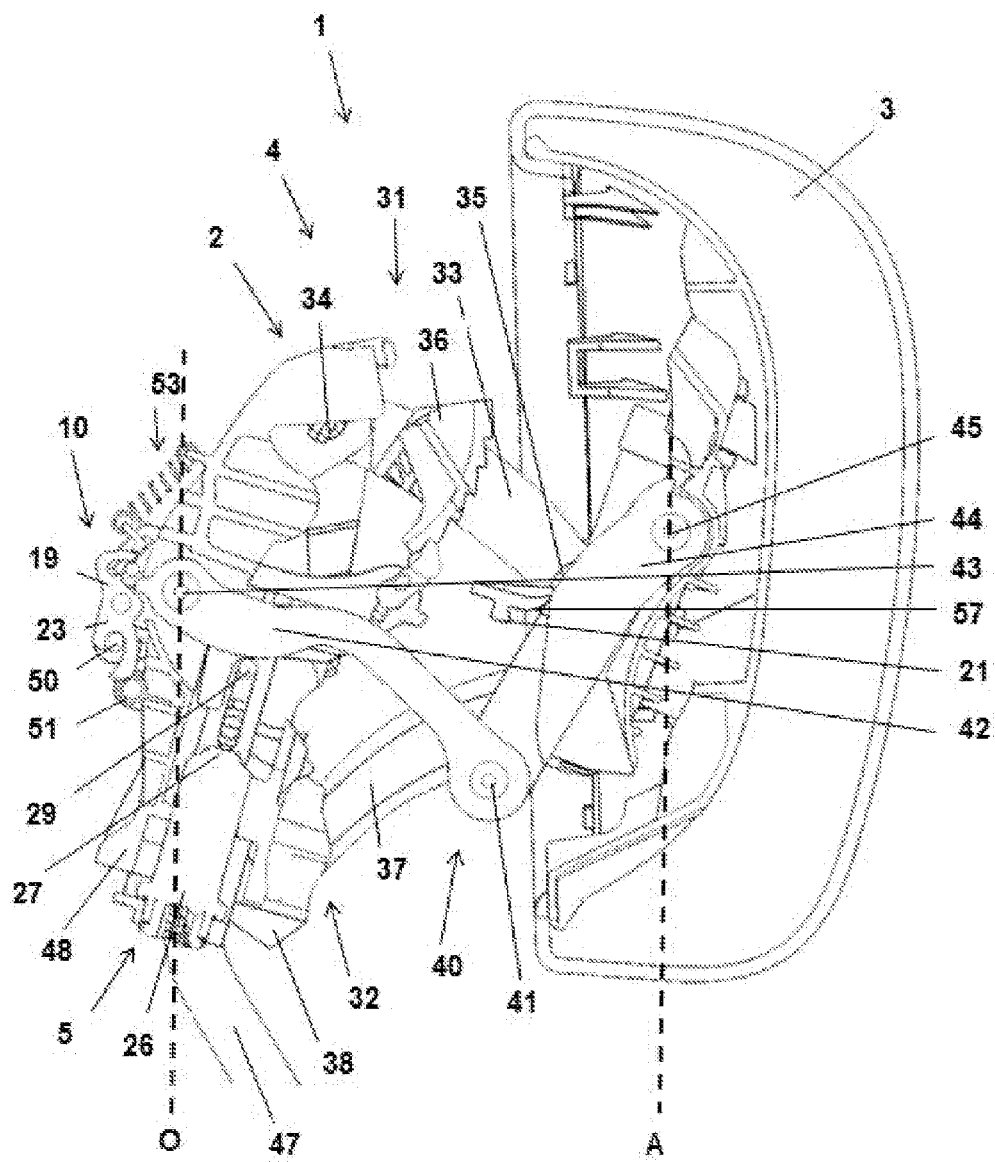
FIG. 11 shows a schematic profile view of the implementation of FIG. 9, the moving part being in the active position.
Figure 16:
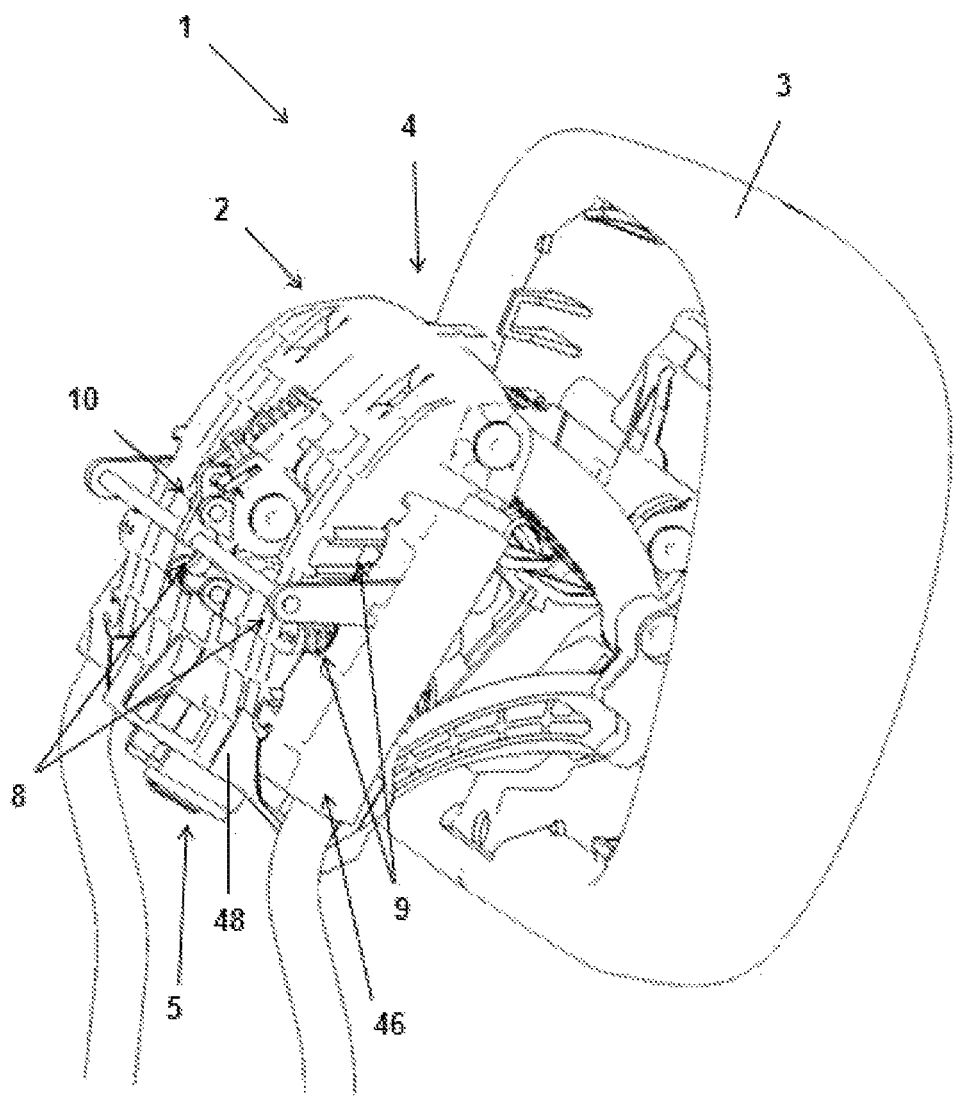
FIG. 16 shows a rear perspective view of the implementation of FIG. 9, the moving part being in the active position.

The moving part 3 is thus continuously moved to the active position "A", and since the damping means 8 has been released due to the release of the retaining means 25 of the second portion 7 from the retaining end 24 of the blocking mechanism 10, the second portion 7 of the moving part 3 is moved to the forward position "AD" with respect to the active position "A" due to the driving of the elastic means 13, the first portion 6 remaining in the active position "A". This situation can be observed in FIG. 4 and in FIG. 8, FIG. 8 showing a longitudinal section perspective view of the headrest 1 of FIG. 1. When the user's head hits the second portion 7 which is located in a forward position, a backward movement of the second portion 7 occurs reaching the active position "A" where the first portion 6 is located. In that situation, the retaining means 25 of the second portion 7 and the retaining end 24 of the retaining cam 23 of the blocking mechanism 10 again face and engage one another, the attachment of the second portion 7 and of the first portion 6 being attained again forming a single compact body of the moving part 3, as can be observed in FIG. 3. FIG. 9 shows a rear perspective view of a second implementation of a headrest 1 in a rest position. The headrest 1 comprises a fixed part 2, a moving part 3 movable with respect to the fixed part 2 from a rest position "O" to an active position "A". FIG. 10 shows a schematic profile view of the implementation of FIG. 9, the moving part 3 being at rest. FIG. 11 shows a schematic profile view of the implementation of FIG. 9, the moving part 3 being in the active position "A". FIG. 16 shows a rear perspective view of the implementation of FIG. 9, the moving part 3 being in the active position "A". Connection means 4 connect the fixed part 2 with the moving part 3. In this implementation, the connection means 4 comprise an upper arm 31 and two lower lateral connection means 32. The upper arm 31 comprises two side levers 33, one of the ends of each side lever 33 pivoting with respect to a respective shaft 34 arranged in the fixed part 2, both shafts 34 being coaxial, and the other end of each side lever 33 pivoting with respect to a respective shaft 35 of the moving part 3, both shafts 35 being coaxial. The upper arm 31 also comprises a central body 36 whereby both side levers 33 are attached to one another.

The lower connection means 32 comprise a guide arm 37 attached to the moving part 3 and a channel 38 arranged in the fixed part 2. The moving part 3 is guided to the fixed part 2 by means of the connection between the guide arm 37 and the channel 38, and the inclination of the moving part 3 along the path from the rest position "O" to the active position "A" is determined by the connection between the guide arm 37 and the channel 38, the connection being defined by the design of the contour of the guide arm 37 which fits with the height of the channel 38 for all the positions of the desired path of the moving part 3. The guide arm 37 may further comprise a stop 39 which may be housed in a transverse hole of the guide arm 37 and delimits the furthest position of the moving part 3 with respect to the fixed part 2; the guide arm 37 can have several transverse holes, such that different end positions of the moving part 3 can be chosen according to which hole houses the stop 39. The path and the end position of the moving part 3 are thus defined with the design provided for the guide arm 37 and for the channel 38, as well as with the choice of the position of the stop 39.

The headrest 1 is an active headrest comprising a drive system, the drive system comprising a drive device 5 for driving and moving the moving part 3 with respect to the fixed part 2. In this implementation, the drive device 5 comprises a pyrotechnic drive device 26, the pyrotechnic drive device 26 being supported in the fixed part 2. The pyrotechnic drive device 26 comprises a bolt 27 that can be moved from a rest position to an end position when the charge of the pyrotechnic drive device 26 is activated. The drive system also comprises an articulated device 40 which is pivotally attached to the fixed part 2 and to the moving part 3 at its ends and has at least one pivoting intermediate connection 41, the drive device 5 operatively cooperating with the articulated device 40. In an implementation, the articulated device 40 comprises a first arm 42 pivotally attached to the fixed part 2 at one of its ends with respect to a shaft 43 and to the pivoting intermediate connection 41, and a second arm 44 attached to the pivoting intermediate connection 41 at one of its ends and the other end pivoting with respect to a shaft 45 of the moving part 3. In an implementation, the second arm 44 opens into two parts (FIG. 11 only shows one of the parts) in the area of the pivoting intermediate connection 41, such that it braces the first arm 42 in the attachment.

When the drive device 5 is activated in the moment in which the vehicle is in a crash, the drive device 5 moves the moving part 3 with respect to the fixed part 2 from the rest or passive position "O" to the active position "A".

Figure 12:
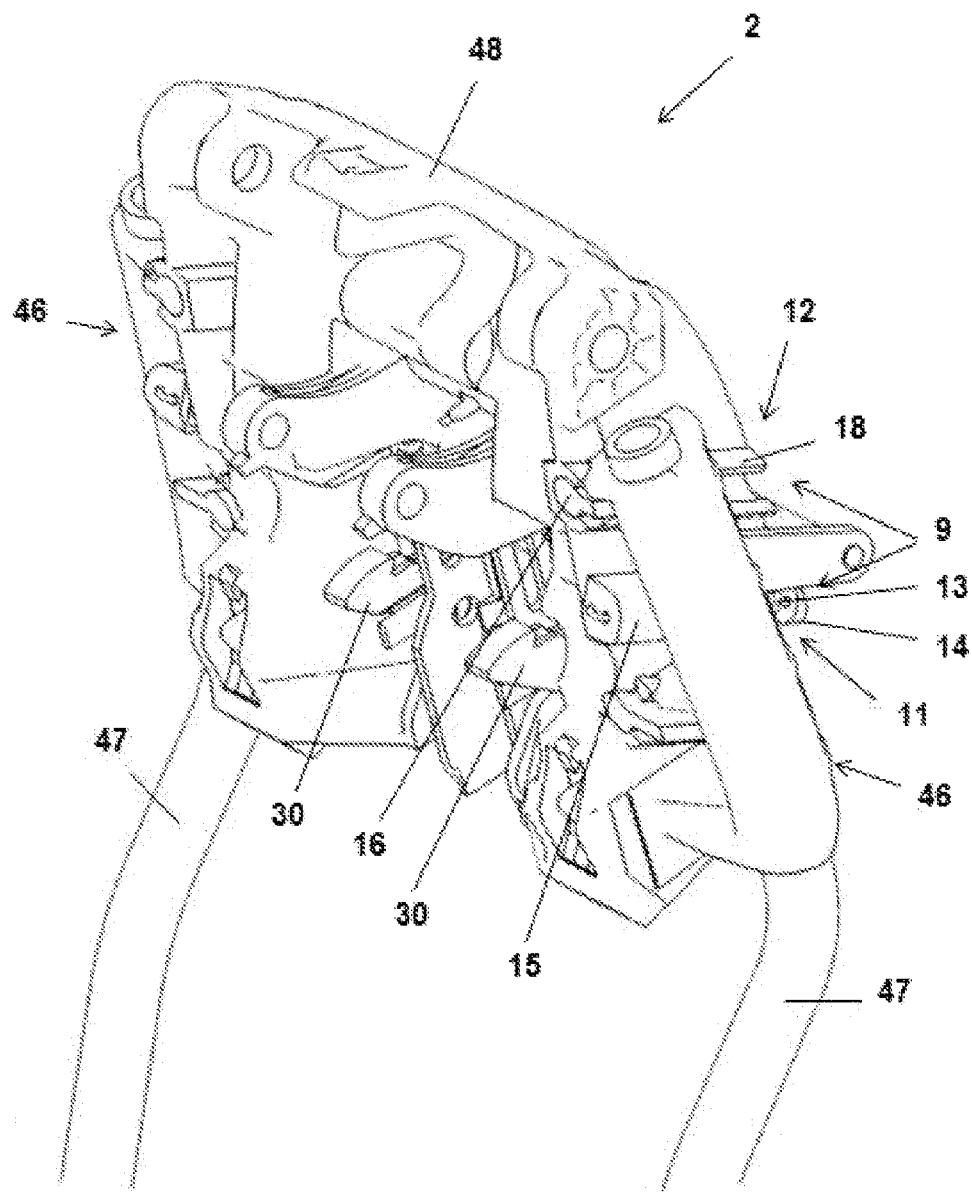
FIG. 12 shows a front perspective view of the fixed part of the implementation of FIG. 9.

FIG. 12 in a schematic perspective view of the fixed part 2 of the implementation of FIG. 9, the fixed part 2 of the headrest 1 comprises a structure 46 attached to rods 47 which in turn attach the structure 46 to the vehicle seat, and a support 48 associated with the structure 46. As can be observed in FIG. 11, the support 48 is attached to the moving part 3 by means of the connection means 4, and the drive device 5 allows moving the moving part 3 to the active position "A" with respect to the support 48, and therefore with respect to the structure 46.

Figure 13:
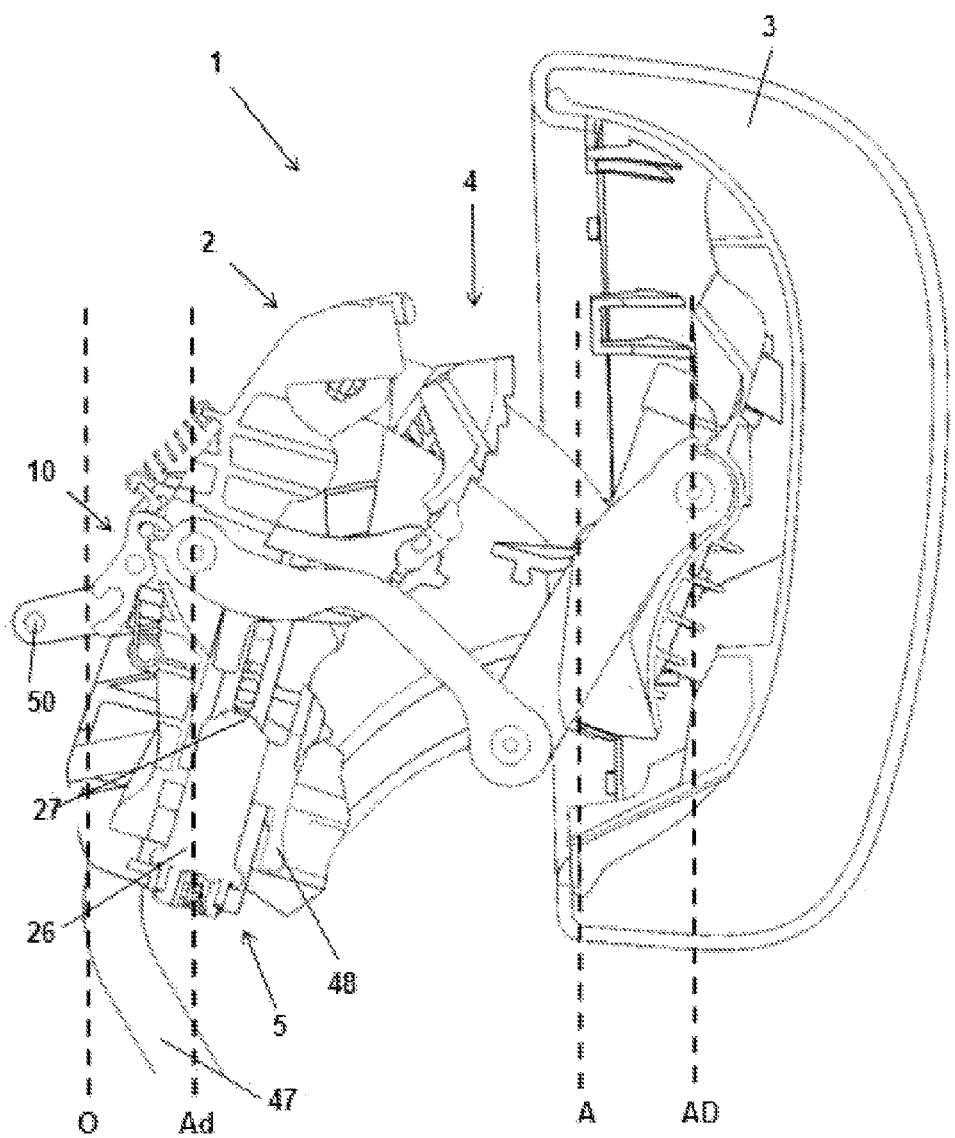
FIG. 13 shows a schematic profile view of the implementation of FIG. 9, the support of the fixed part being located in a forward position with respect to the structure of the fixed part, and the moving part being located in a forward position with respect to the active position.

FIG. 13 shows a schematic profile view of the implementation of FIG. 9, the support 48 of the fixed part 2 being located in a forward position "Ad" with respect to the structure 46, and the moving part 3 being located in a forward position "AD" with respect to the active position "A". To reduce the rebound velocity of the user's head to a greater extent, the headrest 1 includes damping means 8 allowing the movement of the support 48 of the fixed part 2 to the forward position "Ad", and thus allowing the movement of the moving part 3 to the forward position "AD" with respect to the active position "A". After the impact of the user's head with the moving part 3 occurs, the damping means 8 allow the backward movement of the moving part 3 to the active position "A", absorbing energy in the backward movement. To perform this function, the damping means 8 comprises a damping device 9 and a blocking mechanism 10 for the damping device 9, as can be observed in FIG. 9. FIG. 12 shows the damping device 9 of the damping means 8 comprising two identical damping units 11 arranged on both sides of the fixed part 2, which allow the movement of the support 48 of the fixed part 2 with respect to the structure 46, and two identical guiding units 12 arranged on both sides of the fixed part 2, which allow defining the direction of movement of the support 48 of the fixed part 2 with respect to the structure 46 when the damping units 11 move the support 48.

Figure 14:
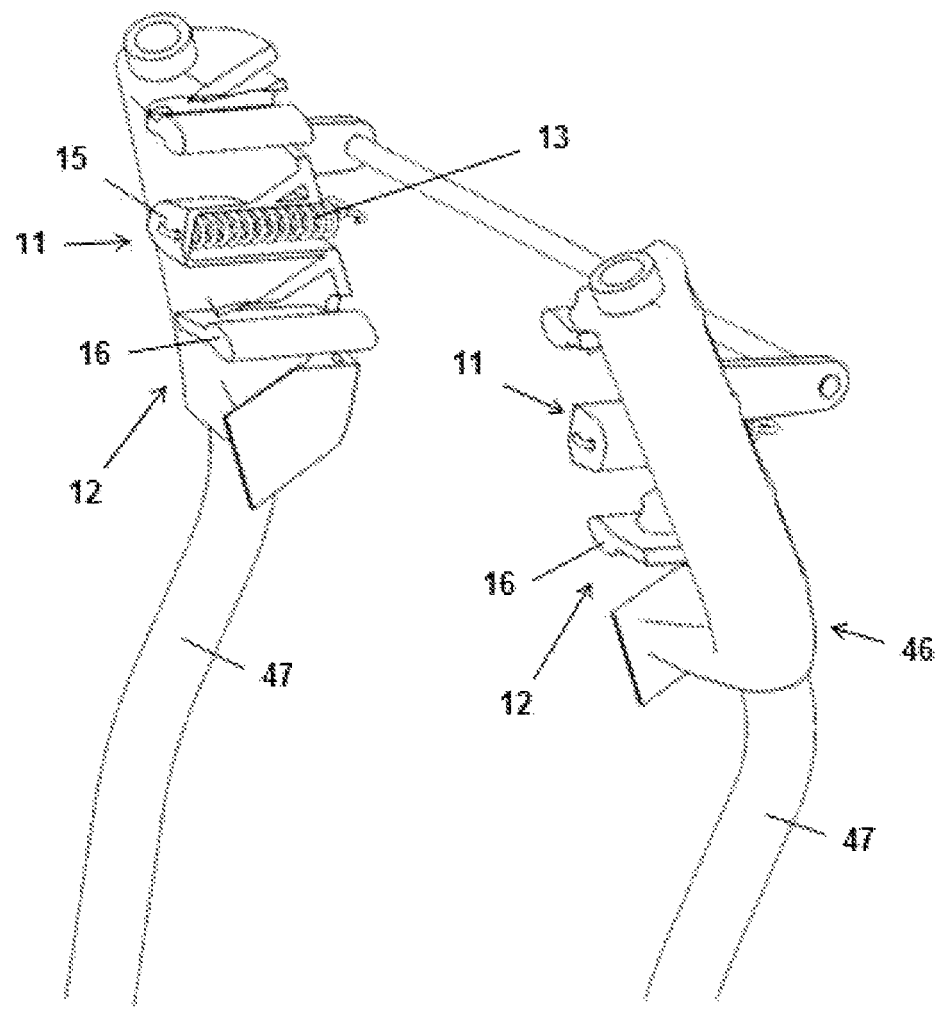
FIG. 14 shows a front perspective view of the structure of the fixed part of the implementation of FIG. 9.

FIGS. 12 and 14 each show a schematic profile view of the structure 46 of the implementation of FIG. 9 with each damping unit 11 comprising elastic means 13, such as a spring or other type of elastic element, a support 14 integrally attached to the support 48 at one end, and a damping guide 15 attached to the structure 46, the elastic means 13 being introduced in the guide 15, one end of the elastic means 13 being attached to a hole of the support 14, and the other end of the elastic means 13 being attached to a hole at one end of the damping guide 15.

Each guiding unit 12 comprises a guide 16 integrally attached to the structure 46, the guide 16 comprising a protuberance (not shown in the drawings) at the end corresponding to the rear part of the support 48, and a guiding support 18 attached to the support 48 with a groove therein that traverses it, the guide 16 being introduced in the groove. Therefore, when the support 48 is moved to the forward position "Ad" it is at least partially driven by the elastic means 13 of the damping unit 11, the elastic means 13 define the movement, the support 48 being moved as the guide 16 slides along the groove of the guiding support 18 until reaching the abutting protuberance, the support 48 not being able to move further forward.

Figure 15:
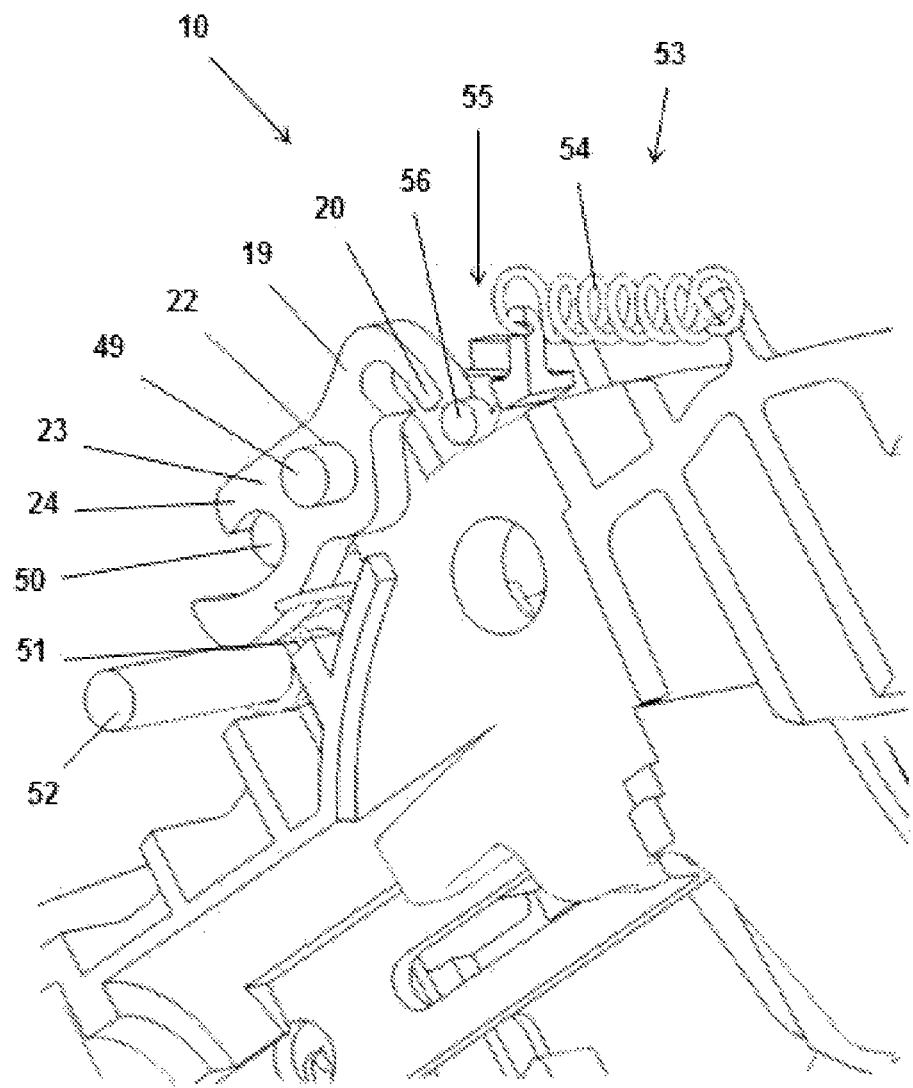
FIG. 15 shows a detailed perspective view of the blocking mechanism of the implementation of FIG. 9.

FIG. 15 shows a perspective view of the blocking mechanism 10 of the implementation of FIG. 9. In this implementation, the blocking mechanism 10 of the damping means 8 comprises a drive cam 19 with a free end 20 and a pivoting end 22 which pivots in a shaft 49 which is attached to the support 48 of the fixed part 2. The blocking mechanism 10 also comprises a retaining cam 23 integrally attached to the pivoting end 22 of the drive cam 19 at one end, and the other end forming a retaining end 24 arranged for cooperating with the structure 46 of the fixed part 2. In this implementation, the structure 46 of the fixed part 2 comprises a retaining rod 50, and the blocking mechanism 10 is pivotally arranged in the support 48 of the fixed part 2 by means of the pivoting end 22 of the drive cam 19, with the retaining end 24 of the retaining cam 23 having an opening arranged facing the retaining rod 50 of the structure 46 and allowing the rod 50 to be able to fit in the opening; the retaining cam 23 and the retaining rod 50 are thus attached to one another since the rod 50 fits in the opening of the retaining end 24 when the support 48 has not been moved to the forward position "Ad", or in other words, when the damping means 8 is blocked from advancing the support 48 forward to the forward position "Ad" as a result of an attachment between the rod 50 and the opening of the retaining end 24. This blocking situation occurs either when the headrest 1 is in the rest position, as can be observed in FIG. 10, or when the support 48 of the fixed part 2 is in the rest situation and the moving part 3 is in the active position "A", as can be observed in FIG. 11. In these rest situations and/or when the moving part 3 is in the active position "A", the elastic means 13 of the damping unit 11 is tensed and therefore potentially loaded. According to some implementations the elastic means 13 is a tension spring such that it is stretched when the damping means is blocked. When the support 48 is released and moved to the forward position "Ad", and therefore the moving part 3 is moved to the forward position "AD", the tension is released from the spring, causing it to contract.

According to some implementations the support 48 of the fixed part 2 comprises elastic means 51, such a spring or other type of elastic element, attached to a shaft 52 at one end, which shaft is in turn attached to the support 48 at its ends, and the other end of the elastic means 51 is free and in contact with the back face of the retaining end 24 of the retaining cam 23. The elastic means 51 thus push the retaining end 24 against the retaining rod 50. The support 48 of the fixed part 2 also comprises a blocking device 53, which comprises elastic means 54, such as a spring or other type of elastic element, with one end attached to the support 48. The blocking device 53 also comprises an L-shaped blocking element 55. The blocking element 55 comprises one side of the L projecting towards the outside of the support 48 and is attached to the other end of the elastic means 54 at its end, and the other side of the L is a U-shaped prolongation having a shaft 56 at the open end crossing the U and leaving a gap between the shaft 56 and the base of the U.

When the headrest 1 is in the rest position as can be observed in FIG. 10, the fixed part 2 and the moving part 3 are attached to one another and form a single compact body. In this arrangement the pyrotechnic drive device 26 is not activated, and the bolt 27 is in the rest situation in a withdrawn position in the drive device 26. The drive device 5 also comprises a drive runner with a shaft 29 fitting in the runner, the shaft 29 of the drive runner being located in its lower position, and the bolt 27 is located below the central part of the shaft 29 of the drive runner. In this implementation, the fixed part 2 of the headrest 1 comprises two fixed hooks 30 integral with the fixed part 2 and attached to a drive guide where the drive runner slides, as can be observed in FIG. 12, the fixed hooks 30 cooperating with the moving part 3 by means of a projection 21 of two hooks 57 which the moving part 3 comprises, as can be observed in FIG. 11, and attached to the moving part 3 by means of elastic connection means (not shown in the figure). The headrest 1 is thus prevented from being able to be opened manually and from being able to access the inside thereof and manipulate the different elements thereof. In this same rest situation, the free end 20 of the drive cam 19 of the blocking mechanism 10 is located at the height of the shaft 56 of the blocking element 55, pushing it due to the effect of the pushing exerted by the elastic means 51 and of the pivoting caused by the pivoting end 22 about the shaft 49, and the retaining end 24 of the retaining cam 23 is engaging the retaining rod 50 of the structure 46 to cause the damping means 8 to be blocked, impeding movement between the support 48 and the structure 46.

In the event the vehicle to which the headrest 1 is attached is in a crash, the pyrotechnic charge of the pyrotechnic drive device 26 is activated when an electric signal arrives from a sensor. The bolt 27 is then activated and goes from the rest position to the end position. Two steps occurring one after the other between the two positions. In the first step, the bolt 27 travels the distance that initially separates it from the lower part of the shaft 29 of the drive runner and then contacts the shaft 29 to impart movement of the shaft 29. With the movement of the shaft 29, the drive runner contacts the lower part of the free end of each hook 57, causing a movement of the hooks 57. Since the hooks 57 are attached to the moving part 3 by means of elastic connections, the latter allow the pivoting of the hooks 57, causing a release of the engagement of the hooks 57 in their projections 21 with respect to the fixed hooks 30, the fixed part 2 and moving part 3 no longer being attached to one another to form a single compact body.

In the second step, the bolt 27 continues the movement and travels the distance separating it from its end position. After traveling the first step, the central upper part of the shaft 29 of the drive runner contacts the lower part of the first arm 42 of the articulated device 40 pushing it, and thus drives and moves it. With the driving, since the first arm 42 is pivotally attached to the fixed part 2 at one of its ends, the first arm 42, having a protuberance 58 at the end rotating about the shaft 43, and in contact with the shaft 56 of the blocking element 55 in the rest situation of the headrest 1, on the opposite side in which the free end 20 of the drive cam 19 pushes the shaft 56, rotates about the shaft 43 pushing the shaft 56, and thus overcoming the pushing exerted by the free end 20 and due to the elastic means 51. Since that pushing is overcome, the free end 20 of the drive cam 19 is introduced into the gap formed between the shaft 56 and the base of the U of the L-shaped part, the end 20 being blocked by the effect of the traction force exerted by the elastic means 54 on the blocking element 55. The blocking mechanism 10 can thus rotate freely about the shaft 49 due the effect of the pushing of the elastic means 51, the opening of the retaining end 24 of the retaining cam 23 no longer cooperating with the retaining rod 50, causing a release of the support 48 with respect to its attachment of the structure 46.

Since the first arm 42 of the articulated device 40 is pivotally attached to the pivoting connection 41 at its other end, and the second arm 44 of the articulated device 40 is attached to the pivoting connection 41 at one end and is pivotally attached to the moving part 3 at its other end, the second arm 44 is driven, also pivoting in the pivoting connection 41. The moving part 3 is thus driven and moved with respect to the fixed part 2 from a rest position "O" to the active position "A", as can be observed in FIG. 11.

The moving part 3 is thus continuously moved to the active position "A", and the support 48 of the fixed part 2, since the damping means 8 has been released due to the release of the blocking mechanism 10, the damping units 11, with the elastic means 13, drive the support 48 to the forward position "Ad" with respect to the position of the structure 46 which remains in the rest position "O", thereby allowing the moving part 3, which had been moved to the active position "A" due to the driving of the drive device 5, to be moved to the forward position "AD" with respect to the active position "A". This situation can be observed in FIG. 13.

When the user's head hits the moving part 3 which is located in a forward position, a backward movement of the moving part 3 occurs, the connection means 4 and the support 48 also moving backwards with the moving part 3, the moving part 3 reaching the active position "A" and the support 48 reaching the position of the structure 46. In that situation, the blocking system for blocking the headrest acts to keep the moving part 3 in the active position "A", and due to the pushing of the elastic means 51, the blocking mechanism 10 receives the retaining rod 50 with the opening of the retaining end 24 of the retaining cam 23. Due to the backward driving, the free end 20 of the drive cam 19 comes out of the gap formed between the shaft 56 and the base of the U of the blocking element 55, which has been moved backwards as a consequence of the force of the elastic means 54, now leaving the free end 20 with the shaft 56 of the blocking element 55 facing one another due to the force exerted by the elastic means 51 and thereby preventing the retaining rod 50 of the structure 46 and the retaining end 24 of the retaining cam 23 of the blocking mechanism 10 from engaging one another, the attachment of the support 48 and of the structure 46 being blocked.

In the implementations of the headrest 1 disclosed herein, when the backward movement motion occurs, energy is absorbed by means of the elastic means 13 of the damping units 11, introducing resistance to the backward movement by means of the elastic means 13. This absorbed energy will not be returned through the headrest 1 to the user's head in the form of a rebound because the blocking mechanism 10 is again activated and prevents the damping units 11 from acting again. Once the at least one portion of the moving part 3 is in the active position "A", this position is blocked in a precisely calculated position, and the rebound of the user's head will occur at a lower velocity, and therefore will be less violent, because part of the initial energy has already been absorbed.

The foam covering, for example protective foams, of the at least one portion of the moving part 3 of the headrest 1 helps this energy absorption occurring in the backward movement from the forward position "AD" to the active position "A", such that when the user's head impacts, the foam absorbs energy and therefore reduce the rebound velocity of the user's head to a certain extent.

What is claimed is:

1. A headrest for a motor vehicle comprising:
    a fixed part,
    a first moving part coupled to and moveable in a forward direction with respect to the fixed part,
    a second moving part coupled to and moveable with respect to the first moving part, the second moving part having a surface adapted for engaging the head of a passenger,
    the headrest capable of assuming a first state wherein each of the first moving part and second moving part resides in a rest position to form together with the fixed part a first compact body,
    the headrest capable of assuming a second state wherein the first moving part and second moving part form together a second compact body apart from the fixed part with the first moving part located in a forward position with respect to the fixed part so that the second moving part may assume a first active position forward of its rest position,
    the headrest capable of assuming a third state wherein the second moving part is located in a forward position with respect to the first moving part so that the second moving part may assume a second active position that is located forward of the first active position, when in the third state the second moving part is moveable in a backward direction to assume the first active position and to form with the first moving part the second compact body upon the application of a backward directed force being applied to the surface of the second moving part.

2. A headrest according to claim 1, further comprising a drive system configured to move the second compact body forward with respect to the fixed part.

3. A headrest according to claim 1 comprising:
    a first attachment mechanism operable to secure the first moving part to the fixed part, the first attachment mechanism releasable to enable the first moving part to be moved in the forward direction with respect to the fixed part so that the second moving part may be moved forward from the rest position to the first active position; and
    a second attachment mechanism operable to secure the second moving part to the first moving part, the second attachment mechanism releasable to enable the second moving part to be moved in the forward direction with respect to the first moving part so that the second moving part may assume the second active positive.

4. A headrest according to claim 3, further comprising a damping assembly co-operable with the first and second moving parts, the damping assembly configured to guide the movement of the second moving part with respect to the first moving part upon a release of the second attachment mechanism, the damping assembly including an elastic member that urges the second moving part in the forward direction with respect to the first moving part,
    when in the second active position the second moving part Is moveable backward to the first active position where the second moving part and the first moving part are attached via the second attachment mechanism upon the application of the backward directed force being applied to the surface of the second moving part, the damping assembly configured to guide the backward movement of the second moving part with the elastic member configured to absorb energy imparted by the backward movement of the second moving part.

5. A headrest according to claim 1, further comprising a blocking assembly capable of assuming a first position, a second position and a third position, in the first position the blocking assembly provides a first attachment between the first moving part and the fixed part and a second attachment between the second moving part and the first moving part, in the second position the blocking assembly is configured to cause a release of the first attachment to enable the first moving part to be moved forward from the fixed part so that the second moving part may be moved forward from the rest position to the first active position, in the second position the blocking assembly is also configured to release the second attachment to enable the second moving part to be moved forward from the first moving part so that the second moving part may assume the second active positive, when in the second active position the second moving part Is moveable backward to the first active position whereupon the blocking assembly is capable of assuming the third position whereby the second moving part is attached to the first moving part via the second attachment.

6. A headrest according to claim 5, wherein the blocking assembly comprises a pivoting cam having a first end wherewith the first attachment occurs and a second end opposite the first end wherewith the second attachment occurs.

7. A headrest according to claim 6, wherein when in a first pivot position a first part of the pivoting cam located at the first end constitutes a part of the first attachment and a second part of the pivoting cam located at the second end constitutes a part of the second attachment.

8. A headrest according to claim 7, wherein when in a second pivot position the first part of the pivoting cam located at the first end assumes a position whereby the first attachment is released, and the second part of the pivoting cam located at the second end assumes a position whereby the second attachment is released.

9. A headrest according to claim 5, further comprising a damping assembly co-operable with the first and second moving parts, the damping assembly configured to guide the movement of the second moving part with respect to the first moving part upon a release of the second attachment, the damping assembly including an elastic member that urges the second moving part in the forward direction with respect to the first moving part,
when in the second active position the second moving part Is moveable backward to the first active position where the second moving part and the first moving part are attached via the second attachment upon the application of the backward directed force being applied to the surface of the second moving part, the damping assembly configured to guide the backward movement of the second moving part with the elastic member configured to absorb energy imparted by the backward movement of the second moving part.

10. A headrest for a motor vehicle comprising:
a fixed part,
a first moving part coupled to and moveable in a forward direction with respect to the fixed part,
a second moving part coupled to and moveable with respect to the first moving part, the second moving part having a surface adapted for engaging the head of a passenger,
the headrest capable of assuming a first state wherein each of the first moving part and second moving part resides in a rest position to form together with the fixed part a first compact body,
the headrest capable of assuming a second state wherein the first moving part and second moving part form together a second compact body apart from the fixed part with the first moving part located in a forward position with respect to the fixed part so that the second moving part may assume a first active position forward of its rest position,
the headrest capable of assuming a third state wherein the second moving part is located in a forward position with respect to the first moving part so that the second moving part may assume a second active position that is located forward of the first active position, when in the third state the first moving part is moveable in a backward direction to assume the rest position and to form with the fixed part a third compact body apart from the second moving part upon the application of a backward directed force being applied to the surface of the second moving part.

11. A headrest according to claim 10, further comprising a drive system configured to move the second compact body forward with respect to the fixed part.

12. A headrest according to claim 10 comprising:
a first attachment mechanism operable to secure the first moving part to the fixed part, the first attachment mechanism releasable to enable the first moving part to be moved in the forward direction with respect to the fixed part so that the second moving part may be moved forward from the rest position to the first active position; and
a second attachment mechanism operable to secure the second moving part to the first moving part, the second attachment mechanism releasable to enable the second moving part to be moved in the forward direction with respect to the first moving part so that the second moving part may assume the second active positive.

13. A headrest according to claim 12, further comprising a damping assembly co-operable with the first and second moving parts, the damping assembly configured to guide the movement of the second moving part with respect to the first moving part upon a release of the second attachment mechanism, the damping assembly including an elastic member that urges the second moving part in the forward direction with respect to the first moving part.

14. A headrest according to claim 13, wherein the first moving part Is moveable backward to the rest position where the first moving part and the fixed part part are attached via the first attachment mechanism upon the application of the backward directed force being applied to the surface of the second moving part.

15. A headrest according to claim 14, further comprising an elastic member situated between the first moving part and the fixed part, the elastic member configured to absorb energy imparted by the backward movement of the second moving part.

16. A headrest for a motor vehicle comprising:
a fixed part,
a first moving part coupled to and moveable in a forward direction with respect to the fixed part,
a second moving part coupled to and moveable with respect to the first moving part, the second moving part having a surface adapted for engaging the head of a passenger,
a first attachment mechanism operable to secure the first moving part to the fixed part, the first attachment mechanism releasable to enable the first moving part to be moved in the forward direction with respect to the fixed part to cause the second moving part to be moved forward from an initial rest position to a first active position,
a second attachment mechanism operable to secure the second moving part to the first moving part, the second attachment mechanism releasable to enable the second moving part to be moved in the forward direction with respect to the first moving part so that the second moving part may assume a second active positive forward of the first active position,
a damping assembly co-operable with the first and second moving parts, the damping assembly configured to guide the movement of the second moving part with respect to the first moving part upon a release of the second attachment mechanism, the damping assembly including an elastic member that urges the second moving part in the forward direction with respect to the first moving part,
when in the second active position the second moving part Is moveable backward to the first active position where the second moving part and the first moving part are attached via the second attachment mechanism upon the application of a backward directed force being applied to the surface of the second moving part, the damping assembly configured to guide the backward movement of the second moving part with the elastic member configured to absorb energy imparted by the backward movement of the second moving part.

17. A headrest according to claim 16, further comprising a damping assembly co-operable with the first and second moving parts, the damping assembly configured to guide the movement of the second moving part with respect to the first moving part upon a release of the second attachment mechanism, the damping assembly including an elastic member that urges the second moving part in the forward direction with respect to the first moving part,
  when in the second active position the second moving part Is moveable backward to the first active position where the second moving part and the first moving part are attached via the second attachment mechanism upon the application of the backward directed force being applied to the surface of the second moving part, the damping assembly configured to guide the backward movement of the second moving part with the elastic member configured to absorb energy imparted by the backward movement of the second moving part.

18. A headrest for a motor vehicle comprising:
a fixed part attached to a seat of the motor vehicle,
a first moving part attached to and moveable forward with respect to the fixed part,
a second moving part attached to and moveable with respect to the first moving part, the second moving part adapted for engaging the head of a passenger positioned within the seat when the motor vehicle is involved in a crash,
a blocking assembly capable of assuming a first position, a second position and a third position, in the first position the blocking assembly provides a first attachment between the first moving part and the fixed part and a second attachment between the second moving part and the first moving part, in the second position the blocking assembly releases the first attachment to enable the first moving part to be moved forward from the fixed part to cause the second moving part to be moved forward from a rest position to a first active position, in the second position the latching assembly also releases the second attachment to enable the second moving part to be moved forward from the first moving part so that the second moving part assumes a second active positive forward of the first active position,
a damping assembly co-operable with the first and second moving parts, the damping assembly configured to guide the forward movement of the second moving part with respect to the first moving part when the latching assembly assumes the second position, the damping assembly including an elastic member that urges the second moving part forward with respect to the first moving part,
when in the second active position the second moving part Is moveable backward to the first active position whereupon the latching assembly assumes the third position to attach the second moving part to the first moving part via the second attachment and the elastic member of the damping assembly acts to absorb energy imparted by the backward movement of the second moving part.

19. A headrest for a motor vehicle comprising:
a fixed part,
a first moving part attached to and moveable with respect to the fixed part,
a second moving part attached to and moveable forward with respect to the fixed part, the second moving part adapted for engaging the head of a passenger,
a first attachment between the second moving part and the fixed part, the first attachment releasable to enable the second moving part to be moved forward from the fixed part and the first moving part to cause the second moving part to be moved forward from an initial rest position to a first active position,
a second attachment between the first moving part and the fixed part, the second attachment releasable to enable the first moving part to be moved forward from the fixed part to cause the second moving part to be moved forward from the first active position to a second active position forward of the first active position,
a damping assembly co-operable with the fixed part and the first moving part, the damping assembly configured to guide the forward movement of the first moving part with respect to the fixed part upon a release of the second attachment, the damping assembly comprising an elastic member that urges the first moving part forward with respect to the fixed part,
when the second moving part is in the second active position the first moving part Is moveable backward to be attached to the fixed part via the second attachment so that the second moving part assumes the first active position.

20. A headrest according to claim 19, further comprising an elastic member situated between the first moving part and the fixed part, the elastic member configured to absorb energy imparted by the backward movement of the first moving part.

* * * * *